Nov. 16, 1937.  S. CERSTVIK  2,099,468
ELECTRICAL GENERATING AND CONTROL SYSTEM
Filed May 3, 1934
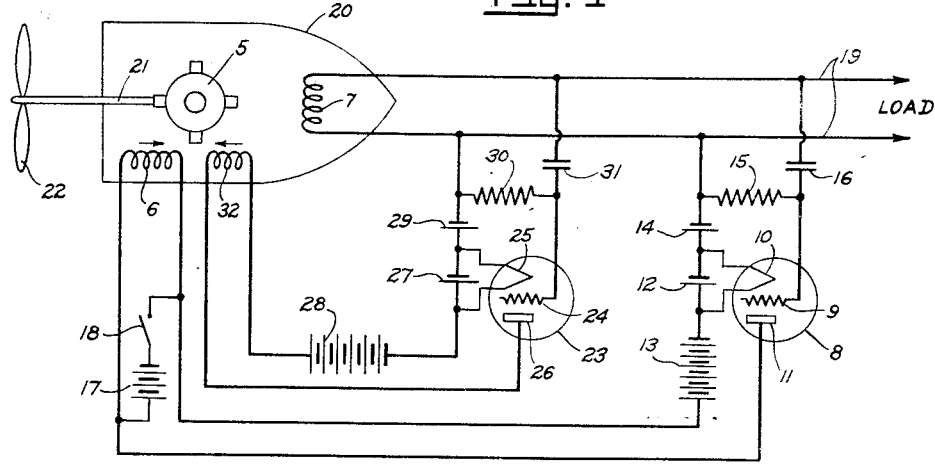
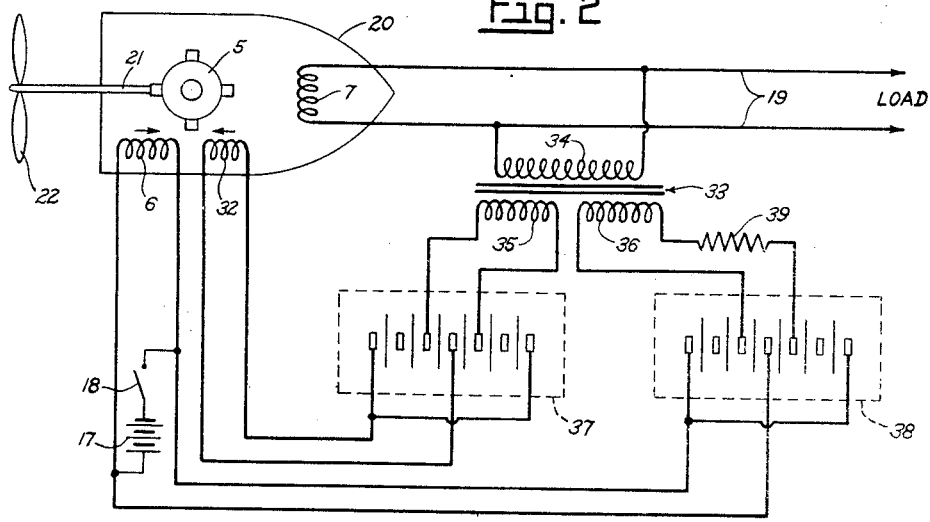
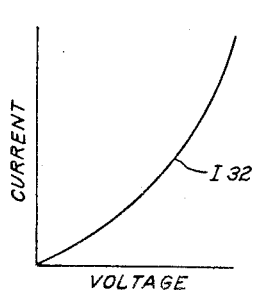
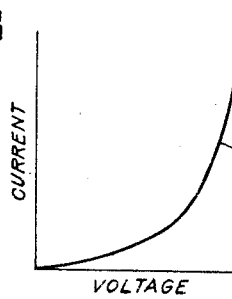
INVENTOR.
Stephen Cerstvik
BY McConkey & Smith
ATTORNEYS.

Patented Nov. 16, 1937

2,099,463

UNITED STATES PATENT OFFICE 2,099,463

ELECTRICAL GENERATING AND CONTROL SYSTEM

Stephen Cersvik, Newark, N. J., assignor to Eclipse Aviation Corporation, East Orange, N. J., a corporation of New Jersey Application May 3, 1934, Serial No. 723,792

2 Claims. (Cl. 171—223)

The present invention relates to electrical generating systems and more particularly to the voltage control thereof.

The novel system embodying the invention is particularly adapted to be employed in places where it is in close proximity to radio receiving and transmitting apparatus as, for example, on aircraft where all equipment is necessarily crowded due to lack of space.

Among the difficulties experienced heretofore with generating systems of existing designs were the effects of electrical disturbances caused by transients produced by commutator sparking, voltage regulator contact sparking, and other similar electrical disturbances. Even in electrical power installations where alternating current is used for the receiver and transmitter of a radio signaling system, it has been the custom heretofore to employ a direct current generator in conjunction with an alternator to supply the field current for the latter, thereby producing electrical disturbances due to commutator sparking. Accordingly, one of the objects of the present invention is to provide a novel electrical generating and voltage control system wherein the foregoing difficulties are eliminated and by reason of which radio signaling is greatly improved.

Another object of the invention is to provide a novel electrical control system for regulating the output voltage of any alternating current generator.

Another object is to provide a novel method of controlling a variable speed alternator whereby the output voltage is maintained substantially constant irrespective of speed.

Another object is to provide a novel electrical generating system whereby a generated potential is maintained substantially constant.

Another object of the invention is to provide a novel electrical generating and voltage control system wherein sliding contacts, such as commutators and collector rings, and make-and-break devices, such as contact voltage regulators, are eliminated and, hence, electrical disturbances in radio receiving systems are prevented.

Another object is to provide a novel generating and control system of the foregoing type including an inductor alternator and a source of electric current whereby auxiliary field excitation may be supplied to said alternator when the residual magnetism thereof is insufficient for self-excitation.

A further object is to provide in a generating system including a variable speed inductor alternator, a novel circuit arrangement whereby a portion of the output of said alternator is rectified and employed as field excitation current therefor to maintain the output voltage substantially constant.

A still further object is to provide in a system of the foregoing type, a novel circuit arrangement whereby two portions of the output current of said alternator are separately rectified to provide a main field excitation and an auxiliary field excitation in opposition thereto and so arranged that the auxiliary field excitation increases relatively faster than the main field excitation for a given increase in the output voltage of the alternator whereby the resultant field excitation is reduced in response to an increase in the output voltage so that the latter is maintained substantially constant.

Still another object is to provide a novel generating and control system which is relatively simple in circuit hookup and in the arrangement and number of parts, yet very efficient in operation and, therefore, particularly suitable for aircraft installations.

The above and other objects and advantages of the invention will appear more fully hereinafter from a consideration of the detailed description which follows, when taken together with the accompanying drawing wherein are illustrated two embodiments of the invention. It is to be expressly understood, however, that the drawing is for the purposes of illustration and description only and is not designed as a definition of the limits of the invention, reference being had for this purpose to the appended claims.

In the drawing, wherein like reference characters refer to like parts throughout the two views:

Fig. 1 is a schematic circuit diagram of one arrangement embodying the present invention;

Fig. 2 is a schematic circuit diagram illustrating another embodiment of the invention; and Figs. 3 and 4 represent characteristic curves of the devices which supply excitation currents to the auxiliary field winding and the main field winding, respectively.

In many instances where alternating current generators are employed, it is necessary to control the generated potential within certain limits. This is especially true where the generated potential is employed to energize the thermionic vacuum tubes of a high frequency signaling system. Ordinarily, the output voltage of an alternating current generator varies with the speed of the generator and it is possible to control the output of said generator by controlling the exciting energy in accordance with changes in the frequency of the output voltage of said generator by means of a tuned circuit associated with the output circuit of the generator and tuned to a frequency lower than the normal operating frequency of the generator. According to the present invention, however, there is provided an additional and novel method of controlling the output of an alternator to maintain the output voltage constant irrespective of the speed, said method consisting generally in varying the field excitation of the alternator in inverse proportion to changes in the voltage of the generated output by taking, segregating or by-passing a portion of the output and utilizing said segregated portion to oppose the main field of said alternator. More specifically, the method consists in using a portion of the output energy to provide a main field excitation current for the alternator and using another portion to provide auxiliary field excitation current which opposes the main field, and causing said opposing field current to increase faster than the main field current for a given increase in the output voltage, thereby reducing or decreasing the resultant field of the alternator as the output voltage of the alternator increases and vice versa, the net result being a substantially constant output from said alternator. Each of the portions of current taken from the output of the alternator is used to control a direct current source or is rectified in order to provide a uni-directional magnetic flux in both the main field winding and the auxiliary field winding.

The novel apparatus for carrying out the novel method described above consists, generally, in an alternator provided with a main field winding and an auxiliary or differential field winding arranged in opposed relation to said main field winding. Each of the windings is directly connected to or associated in inductive relation with the output circuit of the alternator and in circuit with an electronic or similar device or a rectifier device of any suitable type, such as a thermionic vacuum tube type or a copper-oxide type, so that direct current passes through said field windings to produce the necessary magnetic flux, the characteristics of said devices, however, being such that for a given increase in the output voltage of the alternator, the device associated with the auxiliary field winding will provide uni-directional current at a faster rate than the device associated with the main field winding. An external source of potential, such as a battery, is also provided in parallel with the circuit of the main field winding for initially energizing the latter when the residual magnetism in the alternator rotor is insufficient to start the generation of electric current. A switch is also provided for cutting off the external source after the alternator is in operation.

Referring to the drawing, and more particularly to Fig. 1, the generator shown is of the inductor type embodying a rotor 5 which revolves adjacent to the magnetic field produced by a main field winding 6, and an armature winding 7 which constitutes the output of the alternator. A portion of the output from armature winding 7 is by-passed and delivered to an electronic or similar device 8, of the thermionic vacuum tube type, in the present instance, having a grid 9, a filament 10 and a plate 11. Filament current and plate voltage are provided by the batteries 12 and 13, respectively, in the usual manner. A negative bias is provided on the grid 9 by means of a battery 14 through a resistor 15 and set to a predetermined value for a purpose which will appear later. A blocking condenser 16 is provided to prevent the dissipation of the energy from the biasing battery 14 through the output circuit of the alternator, the capacity of said condenser being such as to permit the passage of alternating voltages to the grid 9. The output of the tube 8 is connected to the main field winding 6 thereby producing a magnetic field which is proportional to the value of the output current. As pointed out hereinbefore, it may be necessary to excite the winding 6 from an independent source, such as a battery 17, for starting the alternator, a switch 18 being provided to open the circuit to source 17 when the necessary current is supplied from the tube 8. The main output of the alternator constitutes a supply circuit 19 which may deliver power to the usual devices aboard an aircraft as for example to lights, heaters or to a radio generator. The alternator is shown as of the type designed for aeronautical installation having a stream-lined shell or cover 20 and the rotor 5 thereof adapted to be driven by a propeller shaft 21 from the propeller 22. The rectifier 8 forms one part of the voltage control system.

Means are now provided which constitute the other part of the system for controlling the output voltage of the alternator and, in the form shown, said means comprise a second device 23 of the thermionic vacuum tube type having a grid 24, filament 25 and plate 26. The input to the tube 23 is also supplied by a portion of the energy by-passed from the output winding 7. Filament current and plate voltage for said tube 23 are supplied by batteries 27 and 28, respectively. A negative bias is impressed on the grid by means of a battery 29 through a resistor 30 and a blocking condenser 31 is provided as for the rectifier 8. The output of the tube 23 supplies excitation current to an auxiliary field winding 32 which is wound in opposed relation to the main field winding 6 and has fewer turns than the main field winding so that normally the magnetic field produced by the main field winding predominates. The characteristic curve of the tube 23, in comparison to that of the tube 8 must be such that as the output voltage increases, tube 23 will pass more current than tube 8 for a given increase in the output voltage of the alternator. This may be accomplished by applying a higher negative bias to the grid 9 of tube 8 than that which is supplied to the grid 24 of tube 23, the values of such bias depending upon the rates at which it is desired to have the exciting currents increase in windings 6 and 32 and upon the number of turns of said windings. As an example, if the voltage across the output winding 7 were plotted against the output current supplied to the respective field windings, tube 23 may have a characteristic substantially such as shown in Fig. 4. From these characteristics it will be seen that within the working range for a given increase in voltage the current supplied by tube 23 increases at a faster rate than the current supplied by the tube 8. Thus, as the output voltage of the alternator rises, the main field is increased relatively slowly as compared to the auxiliary field which increases more rapidly. Consequently, since the auxiliary field winding 32 is in opposition to the main field winding 6, as represented by the arrows, the resultant magnetic field of the two windings will decrease as the output voltage increases. The working range may be selected or changed by a proper choice of tubes and biasing potentials therefor.

It will be apparent that when the inductor 5 of the alternator is rotated by means of the propeller 22, and a certain amount of residual magnetism remains in the pole pieces of the main field 6, then as the inductor cuts through the lines of force produced by such magnetism, a current will be generated in the armature 7. The output of the armature 7 is impressed upon the tube 8 which in turn controls the current to the main field winding 6, thus causing a more intense magnetic flux to be built up in the field system, and the alternator thereby assumes its normal potential. At the same time, however, the output is impressed upon the tube 23 and which in turn controls the current through the auxiliary field winding 32, creating a magnetic flux therein which opposes the flux built up by the field winding 6. For a normal value of the output voltage of the alternator the excitation currents in the windings 6 and 32 are such that the main field provided by the winding 6 predominates but, upon an increase in voltage above normal, the excitation current in winding 32 increases at a faster rate than in winding 6 due to the operation of the tubes 23 and 8, respectively, the characteristics of which are selected in accordance with the invention. Consequently, a constant output voltage is maintained since it will be apparent that the resultant field flux will decrease if the output voltage of the alternator increases above the normal value.

In the event that the residual magnetism of the alternator is insufficient to cause current to be generated in the armature 7 by the starting of the system, the switch 18 is used, thereby permitting current to flow through the main field winding 6. The armature current then builds up as before and switch 18 is opened, the system thereafter operating as a unit without the necessity of battery 17 being in the circuit.

Referring to Fig. 2, the alternator is the same as that shown in Fig. 1 and is provided with main and auxiliary field windings and an armature winding, as before, the main difference being in the arrangement whereby current is provided to the coils 6 and 32. In this arrangement, a transformer 33 is provided having a primary winding 34 which is connected across the supply line 19 and having two secondary windings 35 and 36, respectively. Secondary windings 35 and 36 are connected to rectifiers 37 and 38, respectively, which, in this embodiment, are of the copper-oxide type. The rectifier 38 supplies excitation current to the main field winding 6 and rectifier 37 provides excitation current for the auxiliary field winding 32.

The rectifiers 37 and 38 are substantially alike in structure but the characteristic of rectifier 38 is controlled by means of a resistor 39 placed in circuit with the secondary winding 36 in order that said characteristic may conform substantially to that shown in Fig. 4, i. e., so that in comparison with rectifier 37 said rectifier 38 will pass current at a slower rate for a given increase in voltage, thus providing the same decrease in the resultant field excitation upon an increase in the output voltage as is obtained by the embodiment shown in Fig. 1. The operation of the system shown in Fig. 2 is otherwise the same as that of the system shown in Fig. 1.

There is thus provided a novel generating and control system in which the output voltage is maintained substantially constant and in which no circuit interrupting devices are employed during the operation of the system so that no electrical disturbances are produced which would affect a radio signaling system employed in the vicinity thereof.

Although only two embodiments of the invention have been illustrated and described, other changes and modifications in circuit arrangement and selection of parts, which will now appear to those skilled in the art, may be made without departing from the scope of the invention. An alternating current generator differing from the type shown may be employed such as, for example, of the stationary armature and rotating field type, or one having a rotating armature and a stationary field. Reference will, therefore, be had to the appended claims for a definition of the limits of the invention.

What is claimed is:

1. In combination with a source of electromotive force which comprises an alternating current machine having a single output winding and two field windings, said field windings being opposed to each other, an electronic device having its input associated with said output winding and its output with one of said field windings for supplying direct current to the latter winding in proportion to the output voltage, a second electronic device having its input associated with the output winding and its output with the second field winding, and means for controlling an internal characteristic of said second electronic device so that it supplies direct current of such value to said second field winding that the combined strength of the two field windings is reduced in response to an increase in voltage in the output winding.

2. In combination with a source of electro-motive force which comprises an alternating current machine having an output winding and two opposed field windings, an electronic device of the plate-grid-filament type having its grid circuit associated with said output winding and its plate circuit with one of said field windings for supplying direct current to the latter winding, a second electronic device of the plate-grid-filament type having its grid circuit associated with the output winding and its plate circuit with the second field winding for supplying direct current to the latter winding, and means for biasing the grid circuits of said devices so that they supply currents of such values to their respective field windings that the combined strength of said field windings is reduced in response to an increase in voltage in the output winding.

STEPHEN CERSTVIK.